United States Patent
Usui et al.

(10) Patent No.: US 6,174,488 B1
(45) Date of Patent: Jan. 16, 2001

(54) METHOD FOR FABRICATING A LAMINATED MOLDED ASSEMBLY

(75) Inventors: Nubuo Usui; Junichi Suzuki; Hiroyuki Shirozuka, all of Kanagawa-ken (JP)

(73) Assignee: Kasai Kogyo Co., Ltd., Tokyo-To (JP)

( * ) Notice: Under 35 U.S.C. 154(b), the term of this patent shall be extended for 0 days.

(21) Appl. No.: 08/108,543

(22) Filed: Aug. 19, 1993

(30) Foreign Application Priority Data

Oct. 26, 1992 (JP) .................................................. 4-287958
Oct. 26, 1992 (JP) .................................................. 4-287959

(51) Int. Cl.[7] .......................... B29C 33/02; B29C 33/46; B29C 45/14; B29C 51/10
(52) U.S. Cl. ............................ 264/511; 264/265; 264/266
(58) Field of Search .................................. 264/511, 259, 264/263, 266, 267, 316, 265

(56) References Cited

U.S. PATENT DOCUMENTS

| | | |
|---|---|---|
| 3,091,946 | 6/1963 | Kesling . |
| 3,183,292 * | 5/1965 | Dvoracek ........................... 264/335 |
| 3,347,966 * | 10/1967 | Seefluth .............................. 264/335 |
| 4,025,372 | 5/1977 | Fenton . |
| 4,364,895 * | 12/1982 | Underwood ........................ 264/335 |
| 4,438,065 * | 3/1984 | Brown ................................ 264/335 |
| 4,639,341 * | 1/1987 | Hanamoto et al. ................. 264/513 |
| 4,653,997 * | 3/1987 | Sheffield et al. ................... 264/335 |
| 4,710,338 * | 12/1987 | Bagnall et al. ..................... 264/266 |
| 4,873,045 * | 10/1989 | Fujita et al. ....................... 264/259 |
| 4,923,539 * | 5/1990 | Spengler et al. ................... 264/511 |
| 4,994,224 * | 2/1991 | Itoh et al. .......................... 264/511 |
| 5,178,815 * | 1/1993 | Yokote et al. ..................... 264/259 |
| 5,281,383 * | 1/1994 | Ueki et al. ......................... 264/259 |
| 5,292,465 * | 3/1994 | Kobayashi et al. ................ 264/266 |
| 5,352,397 * | 10/1994 | Hara et al. ......................... 264/266 |

FOREIGN PATENT DOCUMENTS

| | | | |
|---|---|---|---|
| 3604175 | 8/1986 | (DE) . | |
| 45421 | 2/1982 | (EP) . | |
| 333198 * | 9/1989 | (EP) . | ................................ 264/259 |
| 343245 | 11/1989 | (EP) . | |
| 371743 | 6/1990 | (EP) . | |
| 466180 | 1/1992 | (EP) . | |
| 551526 | 2/1993 | (EP) . | |
| 2347306 | 11/1977 | (FR) . | |
| 3262751 * | 11/1991 | (JP) . | ................................ 264/266 |

* cited by examiner

Primary Examiner—Angela Ortiz
(74) Attorney, Agent, or Firm—Dickstein Shapiro Morin & Oshinsky LLP

(57) ABSTRACT

In a method and device for molding a laminated molded assembly by simultaneously forming a resin core member and integrally joining a surface skin member in a die assembly for mold press forming comprising an upper die and a lower die, the moldability of the surface skin member is improved by softening the surface skin member by blowing hot air against the surface skin member from air holes provided in the upper die which is associated with the surface skin member. As a result, the surface skin member can favorably conform to the surface contour of the die surface and the resin core member. Optionally, vacuum suction may be applied to the surface skin member to draw it against the corresponding die surface so as to eliminate the possibility of creating localized gaps between the surface skin member and the corresponding die surface. Further, by blowing air of either high temperature or ambient temperature from the air holes provided in the upper die to facilitate the removal of the laminated molded assembly from the upper die, the speed of the molding process can be increased, and the damages and deformation of the laminated molded assembly can be avoided.

6 Claims, 14 Drawing Sheets

METHOD FOR FABRICATING A LAMINATED MOLDED ASSEMBLY

TECHNICAL FIELD

The present invention relates to a device and a method for molding a laminated molded assembly suitable for use as automotive upholstery component parts such as door trims.

BACKGROUND OF THE INVENTION

The conventional structure of an automotive upholstery or interior component such as an automotive door trim, a rear corner trim or the like used on the interior of an automotive body panel is now described in the following with reference to FIG. 21 by taking an example of automotive door trim. This automotive door trim 1 consists of a laminated molded assembly comprising a resin core member 2 molded into a desired contoured shape, and a surface skin member 3 integrally laminated on a front surface of the resin core member 2 and imparted with a suitable cushioning capability.

Because of the demand for ever increasingly complex three-dimensionally contoured shapes, the resin core member 2 is now typically molded by the process of mold press forming offering a favorably molding capability. To simplify the overall fabrication process, often, the surface skin member 3 is integrally joined with the resin core member 2 during the process of mold press forming the resin core member 2.

More specifically, as illustrated in FIG. 22, the surface skin member 3 is mounted on the upper die 4 for mold press forming by using set pins 4a provided therein, and after lowering the upper die 4 for mold press forming until a prescribed clearance is defined between the upper and lower dies 4 and 5, resin material 7 is supplied to the die surface of the lower die 5 for mold press forming from an injection molding device 6 via a hot runner 5a and a plurality of gates 5b branching off from the hot runner 5a.

Then, the upper and lower dies 4 and 5 are closed upon each other, and are engaged with each other so that the surface skin member 3 is integrally joined with the front surface of the resin core member 2 at the same time as the resin material 7 is mold press formed into the resin core member 2 having a prescribed shape.

However, according to this conventional process of integrally joining the resin core member 2 and the surface skin member 3 and completing the laminated molded assembly by mold press forming, the surface skin member 3 may not be able to closely follow the highly complicated surface contour of the resin core member 2 during the process of mold press forming, and the surface skin member 3 may get damaged in some places. Such damages to the surface skin member 3 leads to the leaking of the resin material therefrom, and the assembly involving such damages to the surface skin member is obviously unacceptable as a finished product.

According to this method, since vacuum is created between the upper die 4 and the molded assembly when lifting the upper die 4 upon completion of the step of mold press forming, as a measure for preventing the molded assembly from being pulled by the upper die 4, the lower die 5 is sometimes provided with vacuum suction holes 8 for retaining the molded assembly on the lower die 5 by vacuum suction after opening up the die assembly as illustrated in FIG. 23.

Further, as a method for retaining the molded assembly on the lower die 5 when opening up the die assembly, the resin core member 2 may be provided with undercut portions 2a in the resin core member 2 as illustrated in FIG. 24 so that the molded assembly may be retained by the lower die 5 after completion of the step of mold press forming by engaging the molded assembly with the lower die 5 by using the undercut portions 2a of the resin core member 2. In such a situation, the undercut portions 2a, for instance serving as seat portions for clips and other fasteners, may get damaged in the process.

However, when a vacuum suction mechanism is used as illustrated in FIG. 23, due to the provision of a hot runner 5a and gates 5b for supplying molten resin from an injection molding device, there is a severe restriction on the layout of the vacuum suction holes 7, and the work involved in providing the piping for the vacuum suction holes is substantial.

Further, the need for large additional equipment such as a vacuum pump will increase the cost, and the selection of the material to be molded will be limited.

According to the method of providing undercut portions 2a in the resin core member as illustrated in FIG. 24, these undercut portions 2a will create such problems as hindering the effort to remove the molded product from the lower die 2a, and increasing the possibility of deforming and damaging the molded product when removing the molded product from the lower die 5. Further, the need for the undercut portions 2a leads to the increase in the weight of the resin core member 2, and is detrimental to the desire to reduce the weight of the molded product.

In either of these conventional methods, since the force retaining the molded product to the lower die 5 is so small that the speed of opening the die assembly needs to be kept low, and the time required for the overall fabrication process tends to be increased.

BRIEF SUMMARY OF THE INVENTION

In view of such problems of the prior art, a primary object of the present invention is to provide a device for mold press forming a laminated molded assembly comprising a resin core member prepared by molding molten resin in a die assembly for mold press forming into a desired shape, and a surface skin member which is to be integrally joined with the resin core member during this step of mold press forming, which allows the structure of the die assembly to be simplified.

A second object of the present invention is to provide a device for mold press forming a laminated molded assembly comprising a resin core member and a surface skin member which can prevent the breakage of the surface skin member during the step of mold press forming, thereby avoiding the leaking of molten resin from such a breakage.

A third object of the present invention is to provide a device for mold press forming a laminated molded assembly comprising a resin core member and a surface skin member which allows the surface skin member to follow closely the complicated surface contour of resin core member.

A fourth object of the present invention is to provided a device for mold press forming a laminated molded assembly by using upper and lower dies which allows the molded assembly to be readily removed from the upper die so that the time required for each molding process may be minimized.

These and other objects of the present invention can be accomplished by providing a device for molding a laminated molded assembly including a resin core member and a surface skin member, comprising: a die assembly including a first die having a first die surface having a prescribed surface contour, and a second die having a second die surface adapted to cooperate with the first die surface to define a cavity for mold press forming; actuating means for opening and closing the die assembly by moving the second die relative to the first die; supply means for supplying molten resin to the first die surface of the first die, the molten resin being eventually molded into the resin core member by closure of the die assembly; mounting means provided in the second die for mounting the surface skin member thereon in such a manner that the surface skin member extends over the second die surface; and at least one air hole provided in the second die having one end opening out of the second die surface and another end communicated with air pressure control means.

When the surface skin member is provided with a thermoplastic property, and the air pressure control means may comprise means for supplying hot air to the air hole, the temperature of the hot air being selected so as to impart a desired elongation property to the surface skin member, the surface skin member is preheated and softened so that the surface skin member can easily follow the complex contoured shape of the die surface during the process of mold press forming. Preferably, the surface skin member consists of a thermoplastic elastomer.

Not only the surface skin member can be favorably softened as mentioned above by blowing hot air against the molded assembly from the air blow and vacuum holes provided in the second die, but also the surface skin member can be formed in close conformity with the die surface of the second die by applying suction to the surface skin member from the air hole provided in the second die.

According to the present invention, this device can be conveniently utilized by carrying out the method of the present invention which comprises the steps of: opening a die assembly including a first die having a first die surface having a prescribed surface contour, and a second die having a second die surface adapted to cooperate with the first die surface to define a cavity for mold press forming, second die being provided with at least one air hole communicating the second die surface with air pressure control means; mounting a surface skin member over the second die surface of the second die; supplying molten resin on the first die surface of the first die; closing the die assembly while the molten resin and the surface skin member retain at least some of their plastic properties so as to mold the molten resin into the resin core member and to integrally join the surface skin member with the resin core member; introducing air into the air hole by using the air pressure control means to detach a thus laminated assembly from the second die surface; and opening the die assembly to remove the laminated assembly therefrom.

Thus, the molded assembly can be readily removed from the upper die, and not only the speed of the overall molding process can be increased but also the possibility of damaging and deforming the molded assembly due to the pulling of the same by the second die can be effectively avoided.

According to the present invention, this device can be also conveniently utilized by carrying out the method of the present invention which comprises the steps of: opening a die assembly including a first die having a first die surface having a prescribed surface contour, and a second die having a second die surface adapted to cooperate with the first die surface to define a cavity for mold press forming, second die being provided with at least one air hole communicating the second die surface with air pressure control means; mounting a surface skin member over the second die surface of the second die; supplying molten resin on the first die surface of the first die; introducing hot air into the air hole by using the air pressure control means, the temperature of the hot air being such as to soften the surface skin member; closing the die assembly while the molten resin and the surface skin member retain at least some of their plastic properties so as to mold the molten resin into the resin core member and to integrally join the surface skin member with the resin core member; and opening the die assembly to remove a thus completely laminated molded assembly therefrom.

Preferably, the molding method according to the present invention further comprises the step of supplying air of either high temperature or ambient temperature to the air hole by using the air pressure control means so as to separate the surface skin member from the second die surface of the second die immediately before the step of opening the die assembly to remove the laminated molded assembly. Thus, the molded assembly can be readily removed from the upper die, and not only the speed of the overall molding process can be increased but also the possibility of damaging and deforming the molded assembly due to the pulling of the same by the second die can be effectively avoided.

According to the preferred embodiment of the present invention, the air hole comprises a plurality of air openings opening out of the second die surface, and they may be distributed either substantially entirely over the second die surface or only in a limited region of the second die surface involving a relatively complex surface contour.

In view avoiding the leaving undesired marks on the molded assembly due to the presence of such air openings, each of the air openings is desired to have a maximum lateral dimension of no more than 0.3 mm. Such air openings can be conveniently provided by fitting a plug provided with plurality of openings for communicating the air hole to the second die surface into a terminal end of the air hole where it opens out of the second die surface. Alternatively, the plug may be provided with plurality of axial slots provided around the outer circumferential surface of the plug so as to define openings communicating the air hole to the second die surface in cooperation with the inner circumferential surface of the terminal end of the air hole.

Typically, the first die consists of a lower die while the second die consists of an upper die which can be vertically moved toward and away from the lower die. Since the upper die is not required to have any internal device as opposed to the lower die which is required to have a device for supplying the molten resin, the provision of the piping for the blow air or vacuum suction in the upper die can be achieved without any problem due to the absence of any structure which would obstruct the provision of such piping.

Further, due to the improved facility of removal of the molded product from the second die, the restriction on the material and thickness of the molded product can be eliminated. Since the surface skin member is allowed to closely follow the surface contour of the second die surface, it is possible to mold a resin core member of a relatively small thickness. Further, since the surface skin member is better protected from the influences of pressure and heat from the molten resin in terms of both improved mechanical strength due to better support offered by the second die surface and improved heat transfer due to the favorable contact between the surface skin member and the second die surface, it is possible to increase the temperature of the molten resin, hence its fluidity, and the pressure involved in the step of mold press forming.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
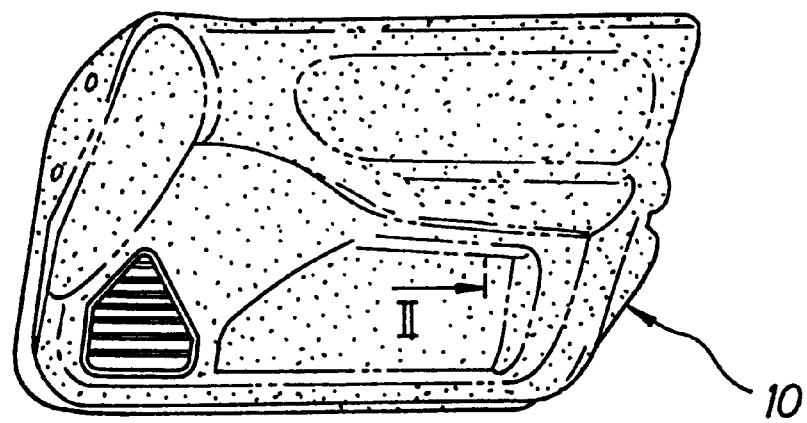
FIG. 1 is an external view of an automotive door trim fabricated according to the principle of the present invention.
Figure 2:
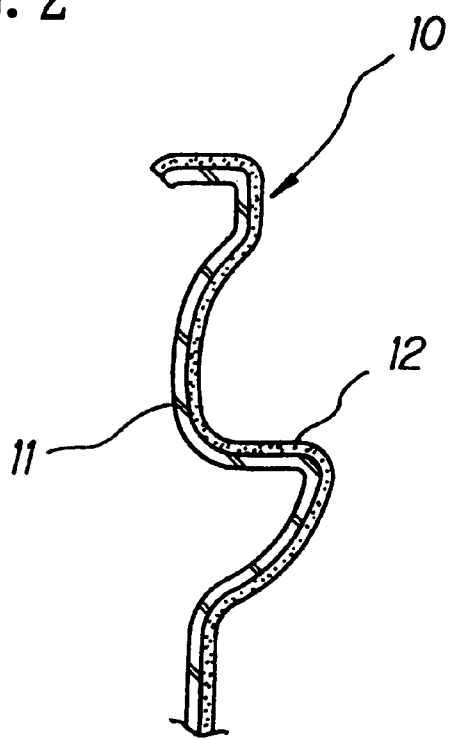
FIG. 2 is a sectional view showing the structure of the automotive door trim illustrated in FIG. 1.

FIG. 1 is an external view of an automotive door trim fabricated by the method of the present invention, and FIG. 2 is a sectional view showing the structure of the automotive door trim. Referring to FIGS. 1 and 2, the automotive door trim 10 fabricated by the method of the present invention generally consists of a resin core member 11 molded into a prescribed shape, and a surface skin member 12 integrally laminated over the front surface of the resin core member 11.

More specifically, the resin core member 11 is molded into a complex contoured shape by supplying and distributing molten resin consisting of a mixture of polypropylene resin and talc in molten state to a die assembly for mold press forming having a prescribed contoured die surface.

The surface skin member 12 may be selected from a number of materials depending on the particular application. For instance, the surface skin member 12 may consist of a unitary sheet such as a PVC sheet and a foamed PVC sheet, a PVC sheet backed by a foamed polyolefin layer such as a foamed polyethylene layer, and a PVC sheet backed by a foamed polyurethane layer. However, more preferably, the surface skin member 12 will demonstrate an elongation by the factor of 2.2 at 40 to 50° C. offering a favorable moldability when it consists of such thermoplastic elastomers as stylene TPE, olefin TPE and so on.

Now is described the structure of the molding device for mold press forming the above described automotive door trim in the following.

Figure 3:
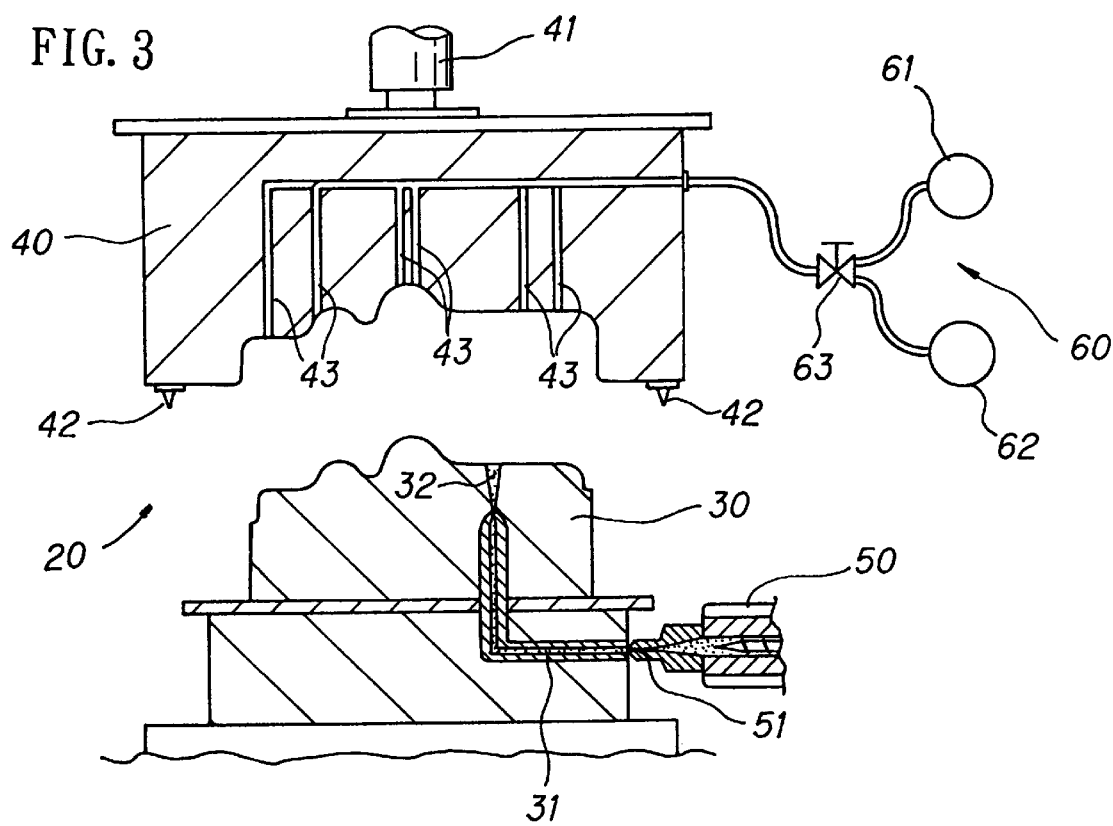
FIG. 3 is a view showing the overall structure of a first embodiment of the molding device according to the present invention.

Referring to FIG. 3, this molding device 20 comprises a lower die 30 for mold press forming having a die surface of a prescribed surface contour, an upper die 40 for mold press forming located above the lower die and having a die surface of a substantially similar shape, a material supplying mechanism for supplying molten resin serving as the material for the resin core member 11 onto the die surface of the lower die 30, and an air blow mechanism 60 provided in the upper die 40.

More specifically, the material supplying mechanism comprises an injection molding device 50 connected to the lower die 30, and the molten resin issuing from the nozzle 51 of the injection molding device 50 is supplied and distributed to the die surface of the lower die 30 as required via a hot runner 31 passed through the lower die 30 and a plurality of gates 32 branching off from the hot runner 31.

The upper die 40 located above the lower die 30 is adapted to be moved vertically by a lifting device 41, and is provided with set pins 42 for mounting the surface skin member 12, and air blow holes 43. The air blow holes 43 are connected to the air blow mechanism 60.

More specifically, the air blow mechanism 60 comprises a hot air generator 61 and an air blower 62 in such a manner that air from them may be selectively supplied to the air blow holes 43 by a switching valve 63.

Now is described the manner in which the automotive door trim 10 is mold press formed by using this molding device 20.

Figure 4:
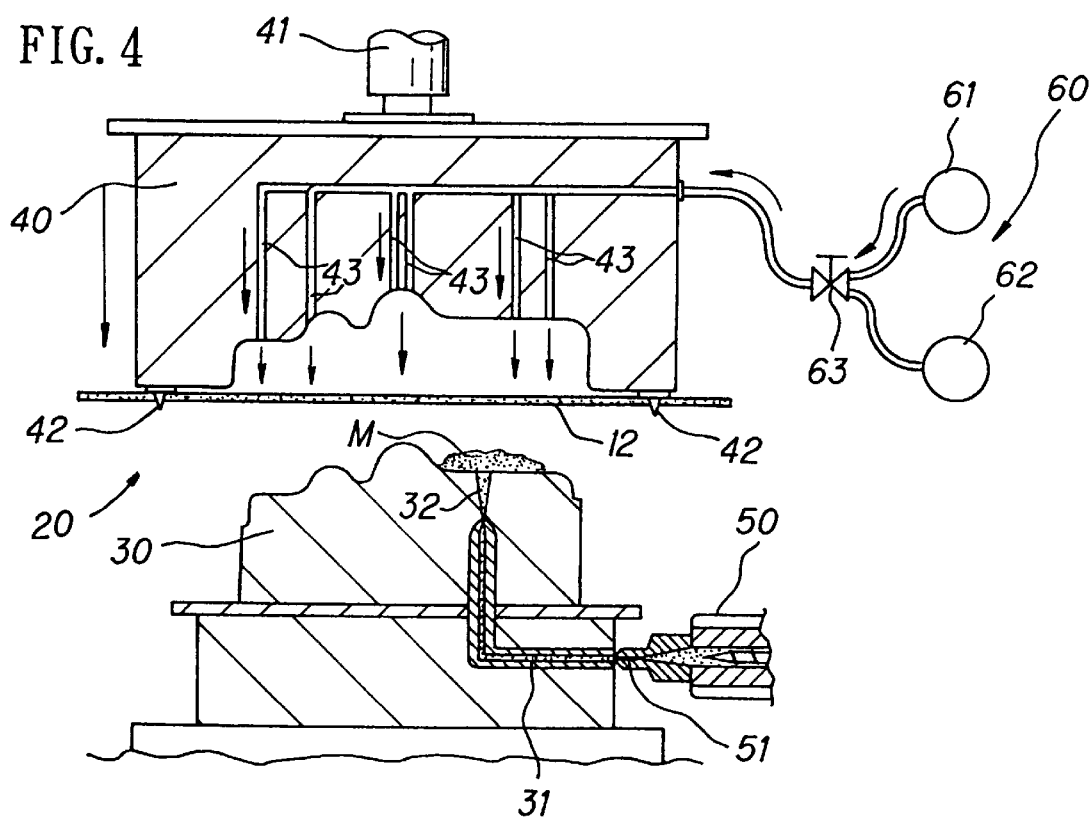
FIG. 4 is a sectional view showing one of the steps of the method for molding a laminated molded assembly according to the present invention in which the surface skin member is preheated.

First of all, as illustrated in FIG. 4, the surface skin member 12 is mounted on the upper die 40 by using the set pins 42 with its reverse surface facing downward.

Once the surface skin member 12 is mounted, hot air of approximately 80° C. is blown against the surface skin member 12 for 30 seconds from the hot air generator 61 via the air blow holes 43, and the surface skin member 12 is softened by this preheating process.

Figure 5:
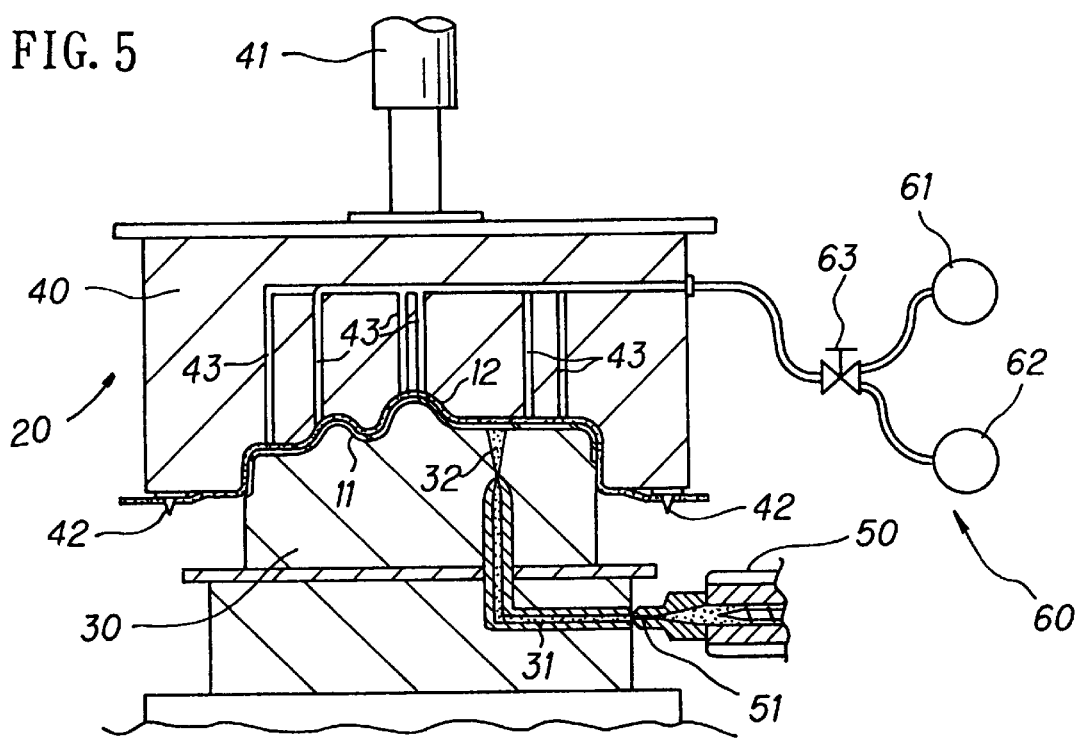
FIG. 5 is a sectional view showing one of the steps of the method for molding a laminated molded assembly according to the present invention in which the mold press forming is carried out.
Figure 6:
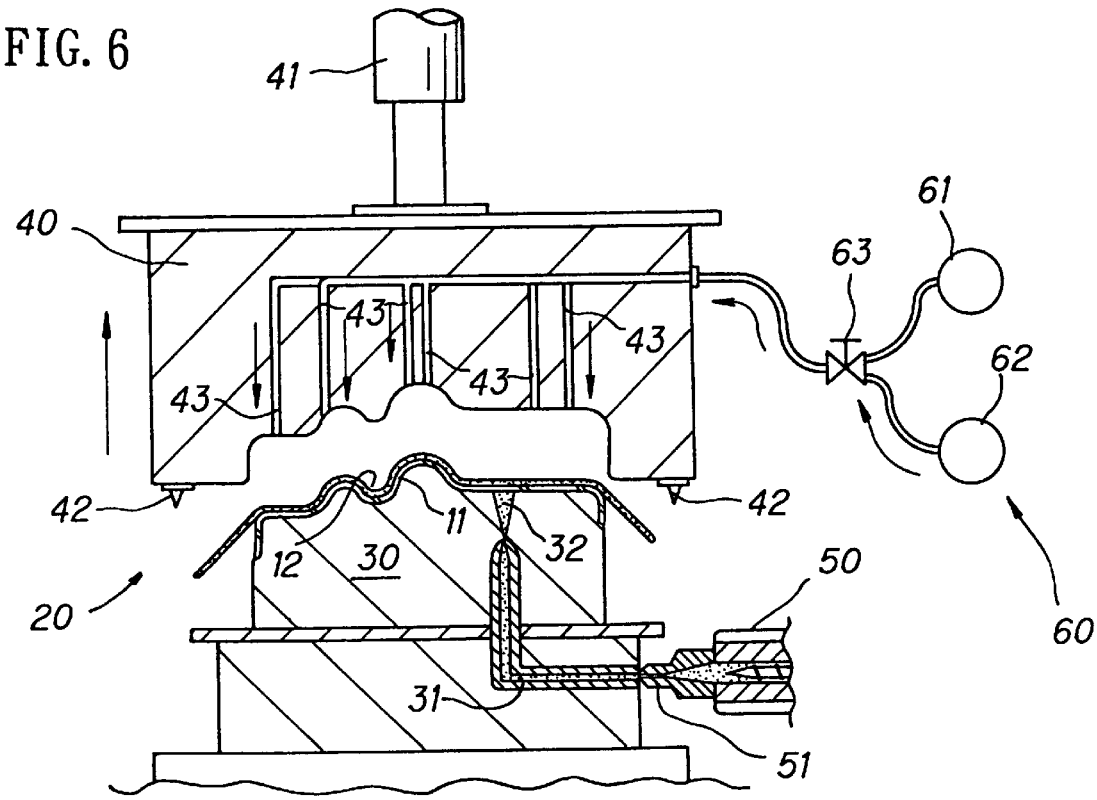
FIG. 6 is a sectional view showing one of the steps of the method for molding a laminated molded assembly according to the present invention in which the molded product is removed from the upper die.

Thereafter, the upper die 40 is lowered by activating the lifting device 41 until a clearance of approximately 30 mm is defined between the upper and lower dies 30 and 40, and the upper die 40 is further lowered while molten resin M issuing from the injection molding device 50 is supplied and distributed to prescribed locations on the die surface of the lower die via the hot runner 31 and the gates 32. Referring to FIG. 5, by closing and engaging the die assembly 30 and 40 so as to involve a certain pressure, the surface skin member 12 is integrally joined with the front surface of the resin core member 11 while the resin core member 11 is molded.

At this time, since the surface skin member 12 is preheated and is given with a favorable elongation property, it can easily follow the complex surface contour of the die surface without breaking. Therefore, it is possible to avoid unacceptable molding results such as the leakage of molten resin.

After the completion of the process of mold press forming and before opening the die assembly, the switching valve 63 is switched over so that unheated air of normal temperature supplied from the air blower 62 is blown against the surface of the molded assembly via the air blow holes 43 and the molded door trim 10 is expelled from the upper die 40 by the pressure of this blown air. Thus, the molded door trim 10 is securely retained by the lower die 30, thereby allowing the upper die 40 to be readily lifted away from the lower die 30, and increasing the speed of opening the die assembly.

By thus allowing the molded automotive door trim 10 to be readily removed from the die assembly by the pressure of the blown air, any undercut portions which might be present in the resin core member 11 would not be damaged or deformed.

According to the present invention, because the air blow mechanism 60 preheats and softens the surface skin member 12 before the process of mold press forming, the moldability of the surface skin member 12 is improved, and the occurrence of unacceptable molding results can be avoided. Further, by blowing air from the air blower 62 against the surface of the molded product such as an automotive door trim 10, the removal of the molded product can be more easily and reliably accomplished, and the speed of opening the die assembly can be increased. Thus, the molding cycle time can be reduced, and the molded product can be better protected through the prevention of damages in undercut portions of the molded product.

Although the present invention only involves a simple structure in which air blow holes 43 are provided in the upper die 40, and an air blow mechanism 60 including a hot air generator 61 and an air blower 62 is connected to these air blow holes 43, the air blow mechanism 60 can effectively improve the moldability of the surface skin member 12, and allows the molded product to be readily removed from the die assembly. Thus, the present invention can improve the functionality of the molding device.

Figure 7:
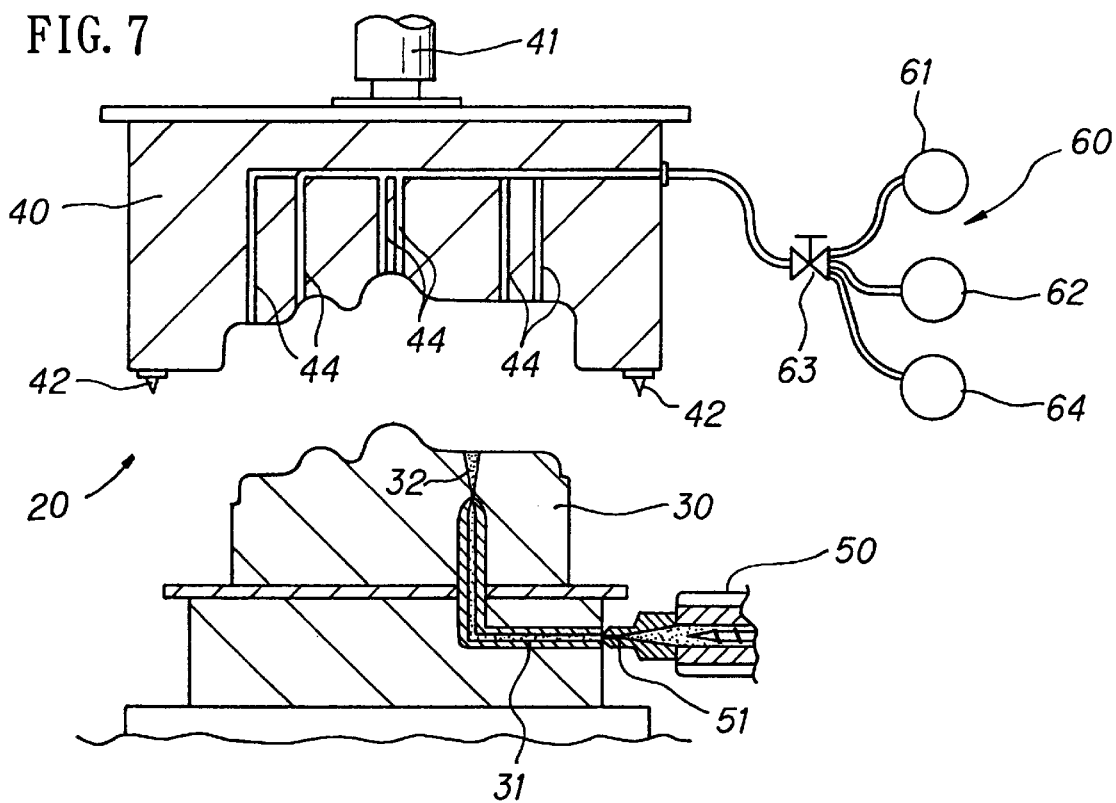
FIG. 7 is a sectional view showing the overall structure of a second embodiment of the molding device according to the present invention.

FIG. 7 shows a second embodiment of the molding device 20 according to the present invention, and the parts of the second embodiment corresponding to those of the first embodiment are denoted with like numerals.

Referring to FIG. 7, air blow and vacuum holes 44 are provided over the entire die surface of the upper die 40, and these air blow and vacuum holes 44 are connected to a hot air generator 61, an air blower 62, and a vacuum pump 64 via a switching valve 63. The switching valve 63 consists of a three-port switching valve.

Figure 8:
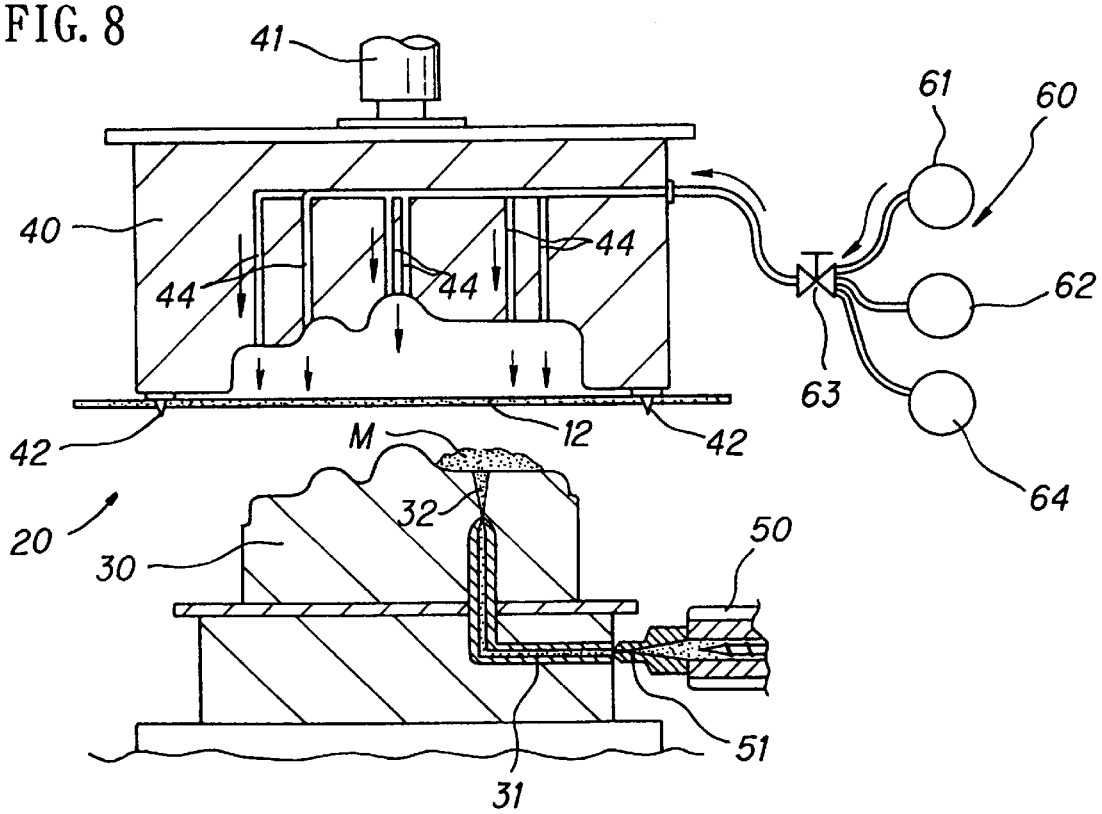
FIG. 8 is a sectional view showing the step of preheating the surface skin member according to the second embodiment of the method of the present invention.

Thus, as illustrated in FIG. 8, after the surface skin member 12 is mounted on the upper die 40 by using set pins 42, hot air from the hot air generator 61 is blown against the surface skin member 12 via the air blow and vacuum holes 44 so that the surface skin member 12 may be softened.

Figure 9:
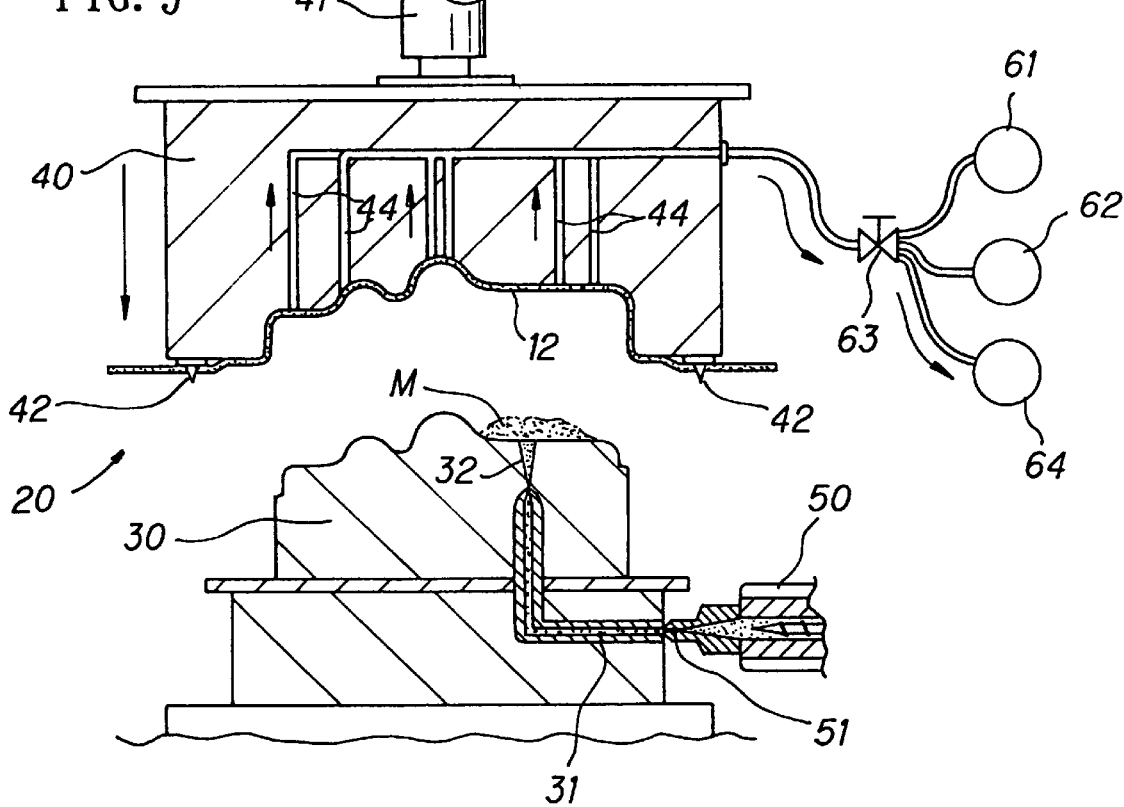
FIG. 9 is a section view showing the step of vacuum molding the surface skin member according to the second embodiment of the method of the present invention.

Then, as illustrated in FIG. 9, the switching valve 63 is switched over, the air blow and vacuum holes 44 are connected to the vacuum pump 64 so that the surface skin member 12 may be vacuum molded against the die surface by virtue of the air blow and vacuum holes 44.

Thereafter, the upper and lower dies 30 and 40 are closed with each other in the same way as in the first embodiment, and the surface skin member 12 is integrally joined with the resin core member 11 while the resin core member 11 is molded in this process of mold press forming the molten resin M.

Thus, according to the present embodiment, since the surface skin member 12 is preheated and softened by the air blow and vacuum holes 44 provided in the upper die 40 and molded by suction against the die surface of the upper die 40, the elongation of the surface skin member 12 can be favorable utilized, and the surface skin member 12 is forced into a close contact with the die surface of the upper die 40. As a result, the surface skin member 12 is kept relatively free from the influences of the heat of the molten resin M, the heat being readily removed by the upper die 40 from the surface skin member 12, the molten resin may be kept fluid enough to ensure a favorable moldability, and the surface skin member 12 is prevented from acquiring an unfavorable external appearance.

Furthermore, by blowing air from the air blower against the molded product via the air blow and vacuum holes 44 after the product has been molded, the molded product can be readily removed from the die assembly, and the time required for the molding process can be reduced.

Figure 10:
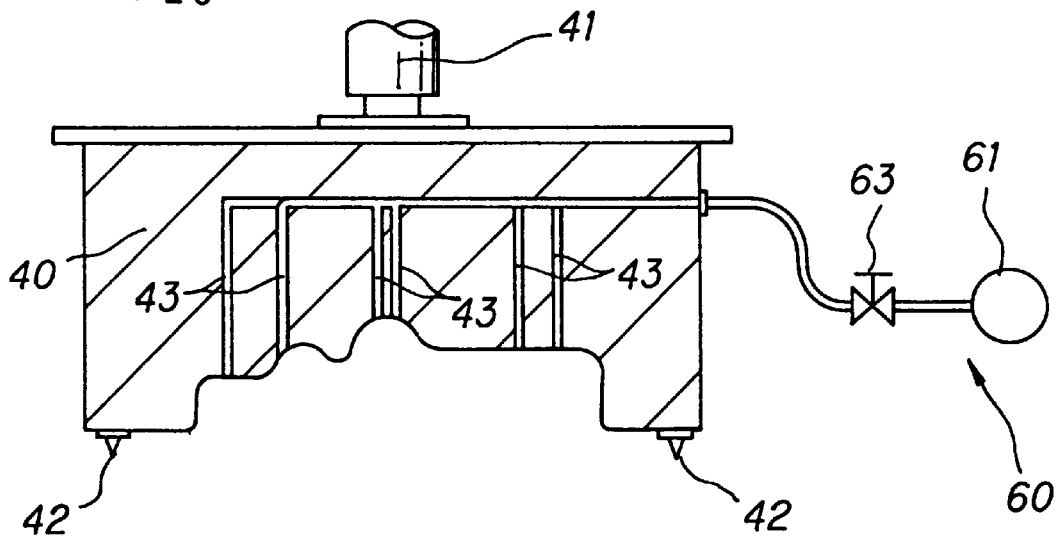
FIG. 10 is a schematic view showing a modified embodiment of the air blow mechanism which may be used in the molding device of the present invention.
Figure 11:
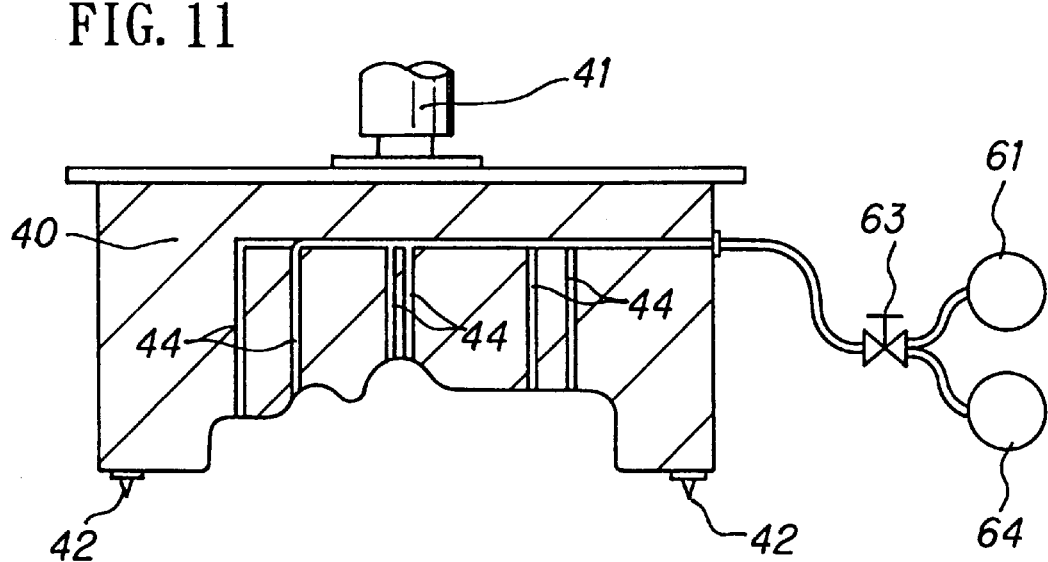
FIG. 11 is a schematic view showing a modified embodiment of the air blow mechanism which may be used in the molding device of the present invention.

Further, the air blow mechanism 61 may consist only of the hot air generator 61 as illustrated in FIGS. 10 and 11 by using the hot air from the hot air generator 61 not only for preheating of the surface skin member 12 but also allowing the molded product to be readily removed from the die assembly after the completion of the process of mold press forming. By doing so, the structure of the air blow mechanism 60 can be simplified.

Figure 12:
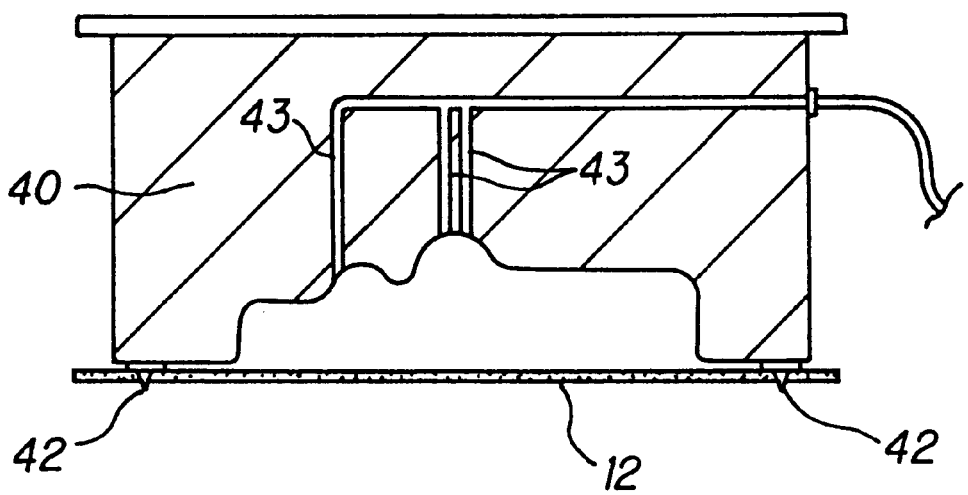
FIG. 12 is a sectional view showing a modified embodiment of the air blow holes provided in the upper die of the molding of the present invention.
Figure 13:
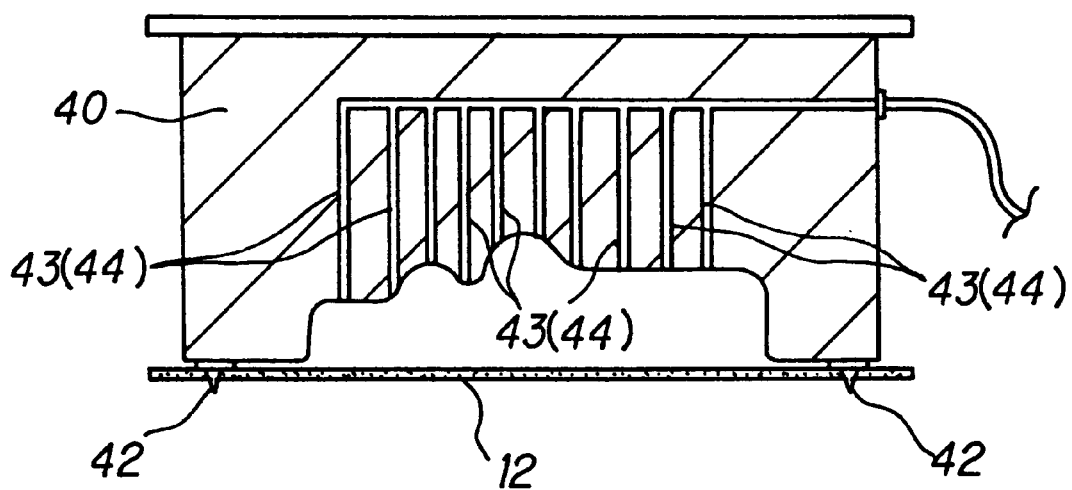
FIG. 13 is a sectional view showing a modified embodiment of the air blow holes provided in the upper die of the molding of the present invention.

Further, the air blow holes 43 may be limited to those areas of the die surface of the upper die 40 involving high degree of complication as illustrated in FIG. 12. Alternatively, the air blow holes 43 or the air blow and vacuum holes 44 may be distributed over the entire die surface of the upper die 40 as illustrated in FIG. 13. In short, such an arrangement can be freely varied according to the shape of the molded product, and the properties of the surface skin member.

Figure 14:
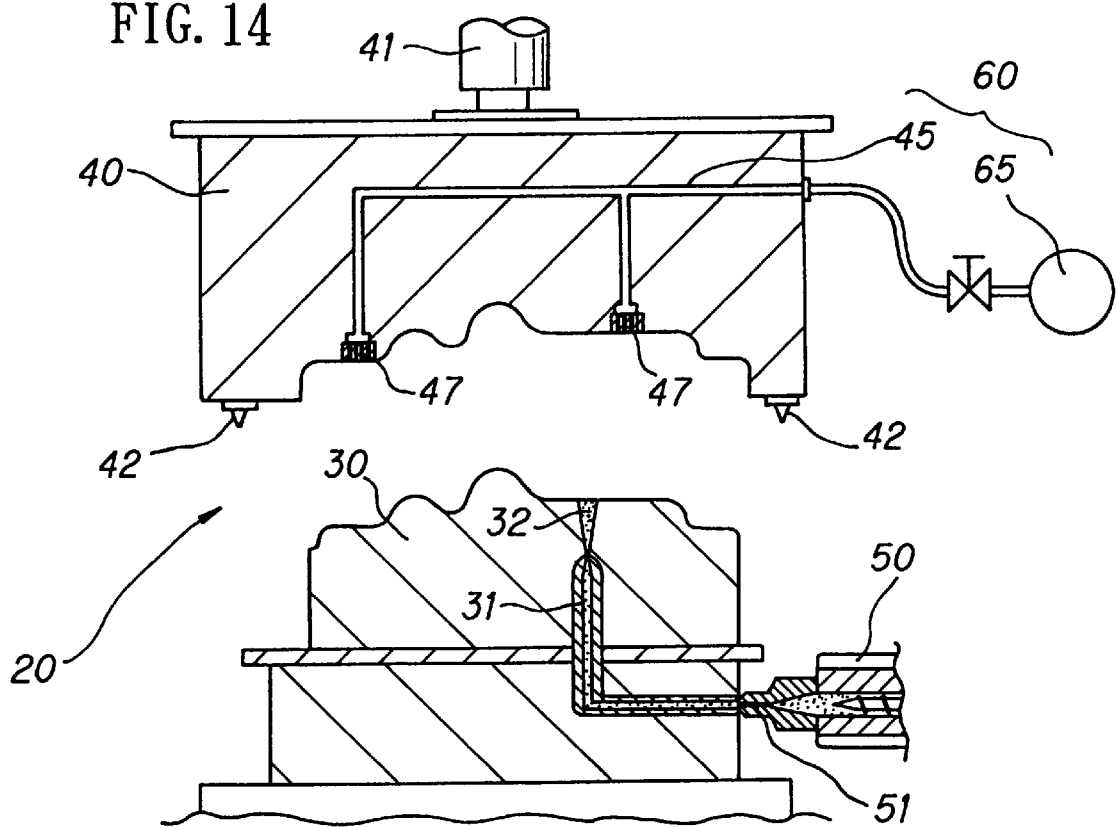
FIG. 14 is a sectional view showing a third embodiment of the molding device according to the present invention.

FIG. 14 shows a third embodiment of the molding device 20 according to the present invention, and the parts of the third embodiment corresponding to those of the first embodiment are denoted with like numerals.

Figure 15:
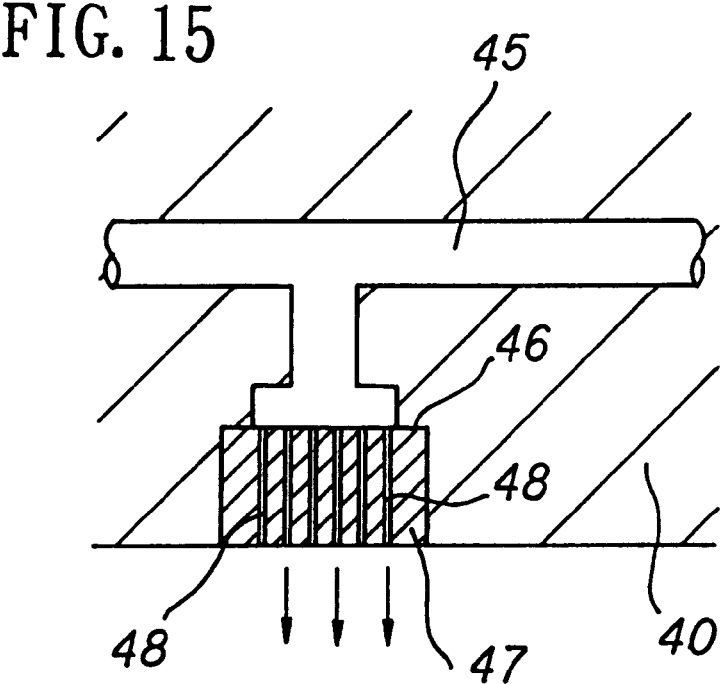
FIG. 15 is an enlarged sectional view of a part of FIG. 14.
Figure 16:
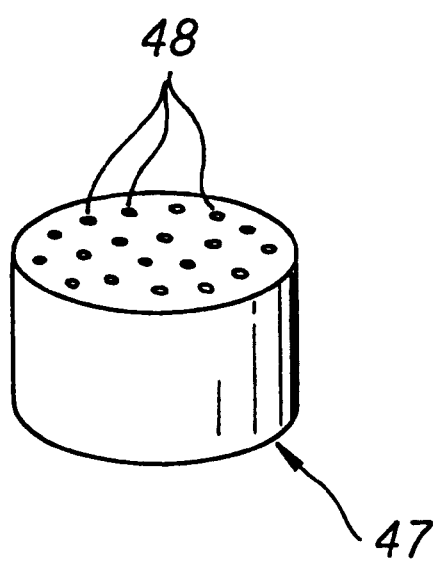
FIG. 16 is an enlarged perspective view of the plug illustrated in FIG. 15.

Referring to FIG. 14, a primary feature of this molding device is the provision of an air blow mechanism 60 in the upper die 40. More specifically, the upper die 40 is internally provided with piping 45 for blow air, and air can be blown against the lower die via the air blow piping 45 and a plurality of air holes 48 provided in the air blow plugs 47 as illustrated in FIGS. 15 and 16.

The air blow piping 45 is connected to a blower 65, and each of the blow air plugs 47 is securely fitted in a corresponding recess 46 provided in a suitable location of the upper die 40.

The molding device 20 according to the present invention is provided with the above described structure, and the method of the present invention is described in the following with reference to FIGS. 17 through 19 by taking an example in the process of molding an automotive door trim 10.

Figure 17:
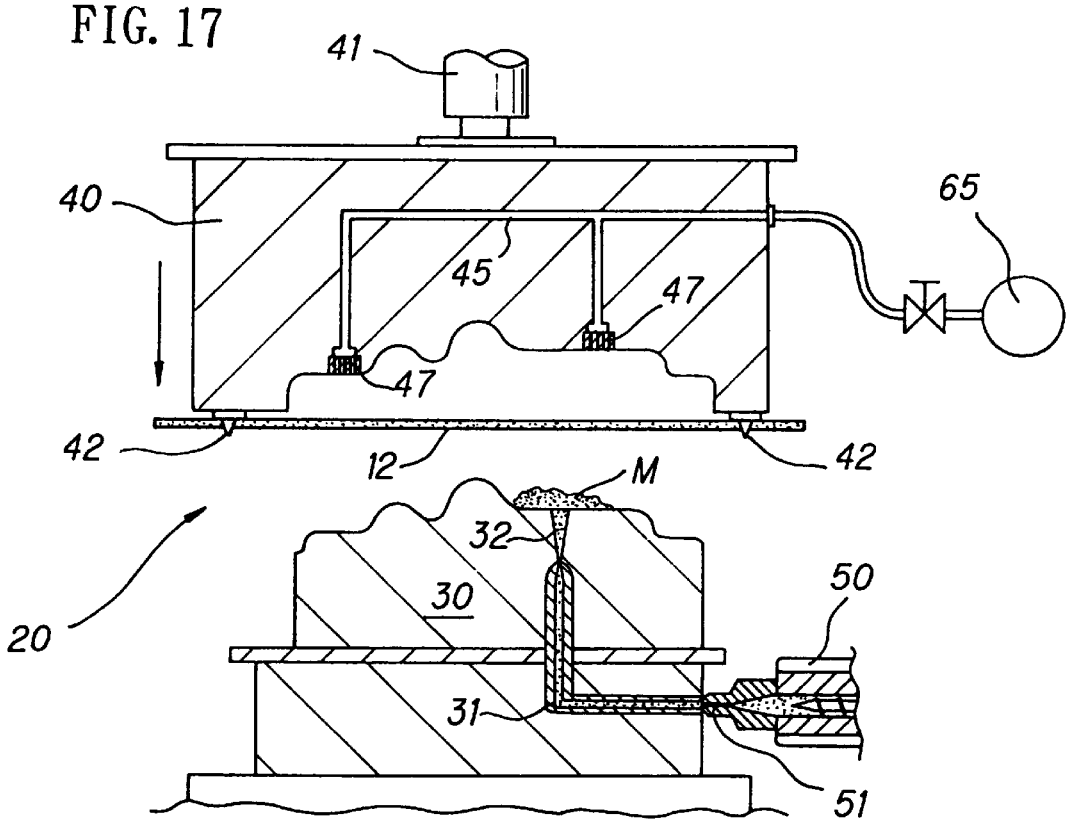
FIG. 17 is a sectional view showing the step of supplying molten resin to the die surface of the first die.

First of all, as illustrated in FIG. 17, when mounting the surface skin member 12 on the upper die 40, the peripheral part of the surface skin member 12 is engaged by set pins 42 provided in the upper die 40.

When the step of mounting the surface skin member 12 is completed, the upper die 40 is lowered by activating the lifting device 41 while molten resin M is supplied and distributed to the die surface of the lower die 30 via the nozzle 51 of the injection molding device 50, the hot runner 31 and the gates 32.

Figure 18:
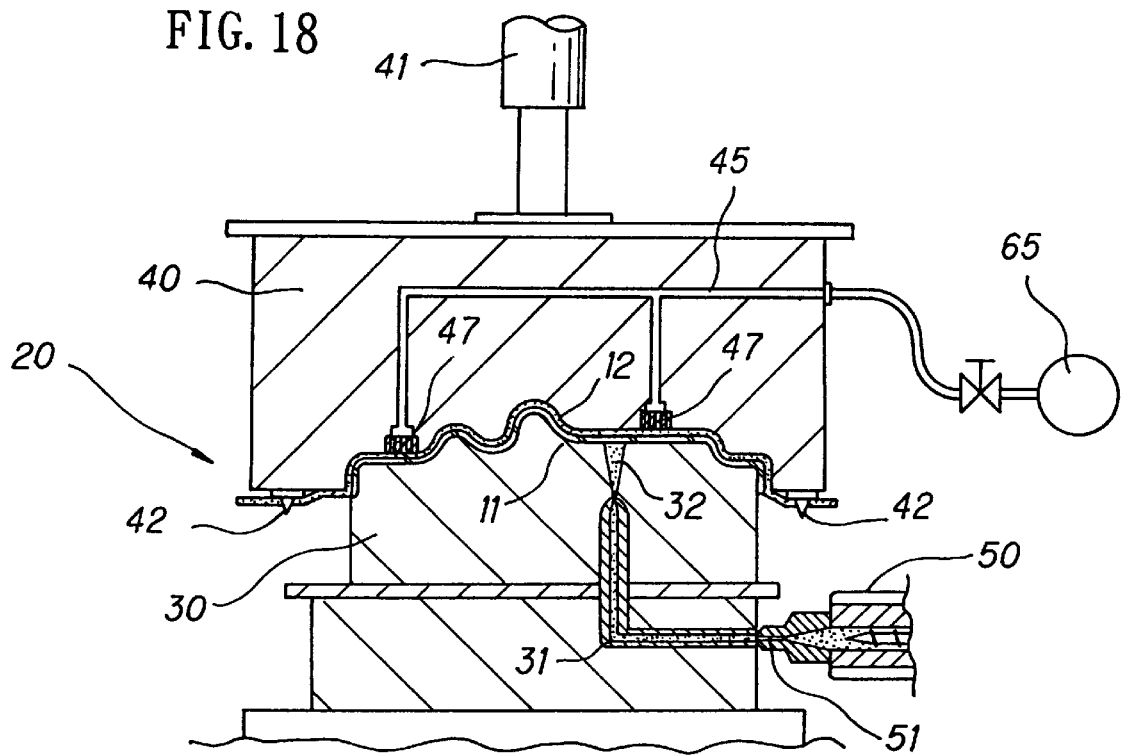
FIG. 18 is a sectional view showing the step of mold press forming.
Figure 19:
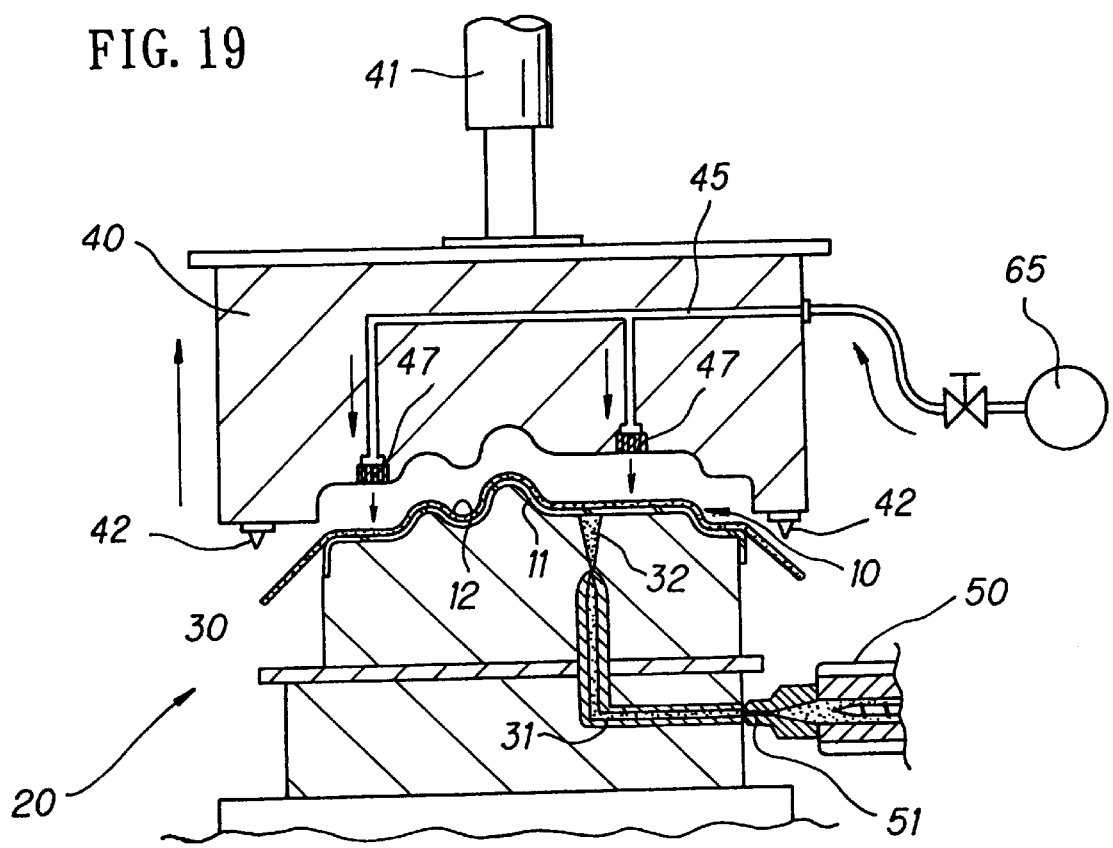
FIG. 19 is a sectional view showing the step of removing the molded assembly from the die assembly.

As a result of engaging the upper and lower dies 30 and 40 for mold press forming while involving a certain pressure, the resin core member 11 is mold press formed into a desired shape while the surface skin member 12 is integrally joined with the resin core member 11 as illustrated in FIG. 18. The pressure involved is 40 to 80 kg/cm$^2$.

The die assembly is opened up after the completion of the step of mold press forming. The air supplied from the blower 65 provided in the upper die 40 and conducted by the air blow piping 45 is blown into the gap between the die surface of the upper die 40 and the surface of the surface skin member 12 via the air holes 48 of the air blow plugs 47, and this air blow pressure pushes the mold press formed door trim 10 against the die surface of the lower die 30 so that the upper die 40 may be swiftly lifted, and the die assembly may be quickly opened up.

The air blow plugs 47 used in the present invention may be made of any material, either metallic or ceramic, as long as it is capable of withstanding the temperature of the molten resin in the range of 150 to 300° C.

The air holes 48 are desired to be equal to or less than 0.3 mm so that no marking may be left on the exterior surface of the surface skin member 12.

Thus, according to the molding device 20 of the present invention, because of its structure featuring the provision of an air blow mechanism 60 in the upper die 40, the layout of the air blow piping 45 can be freely selected as compared to the conventional structure of retaining the molded product by vacuum suction applied from the lower die, and the air blow mechanism 60 has the advantage of economy and simplicity over the vacuum suction mechanism.

Further, according to the method of the present invention, since the air blow mechanism is so effective and the molded product which in this case consists of an automotive door trim 10 is so securely retained on the die surface of the lower die 30 that the speed of opening the upper die 40 can be increased, and the speed of ejecting the door trim 10 from the lower die 30 can be also increased. Thus, the overall time required for the process of molding can be substantially reduced, the restriction on the material and thickness of the product can be removed, and the need for undercut portions can be eliminated so that the fabrication of the die assembly can be simplified, and the weight of the molded product can be reduced.

Figure 20:
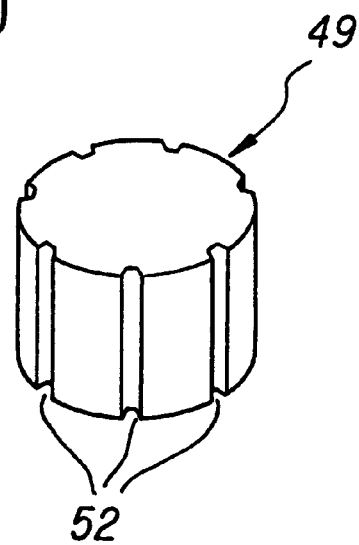
FIG. 20 is a perspective view similar to FIG. 16 showing a modified embodiment of the plug.
Figure 21:
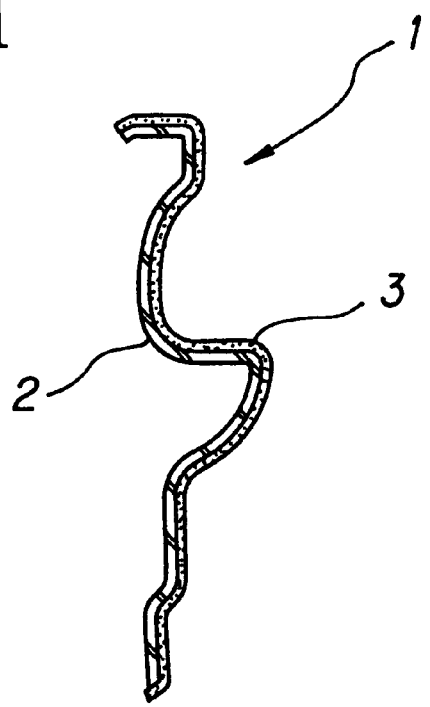
FIG. 21 is a sectional view showing the general structure of an automotive door trim.
Figure 22:
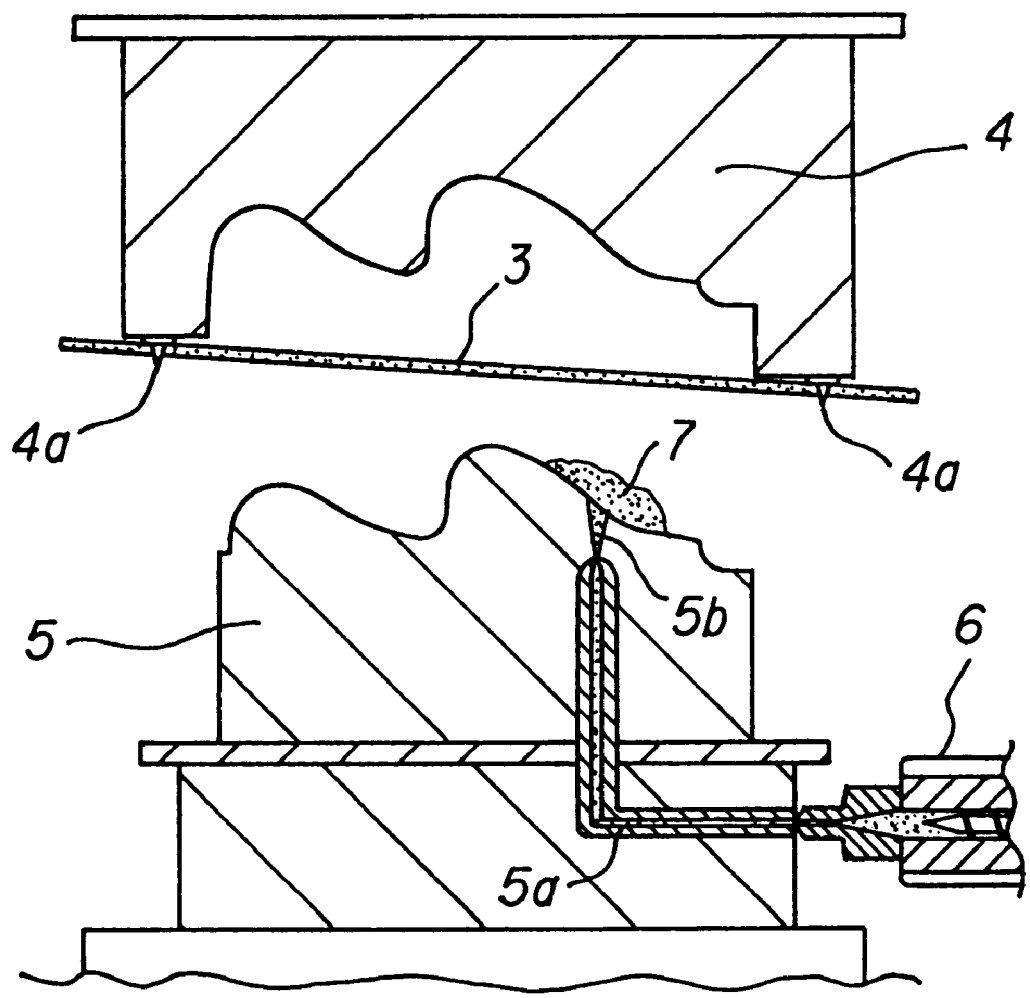
FIG. 22 is a sectional view illustrating the conventional device for mold press forming.
Figure 23:
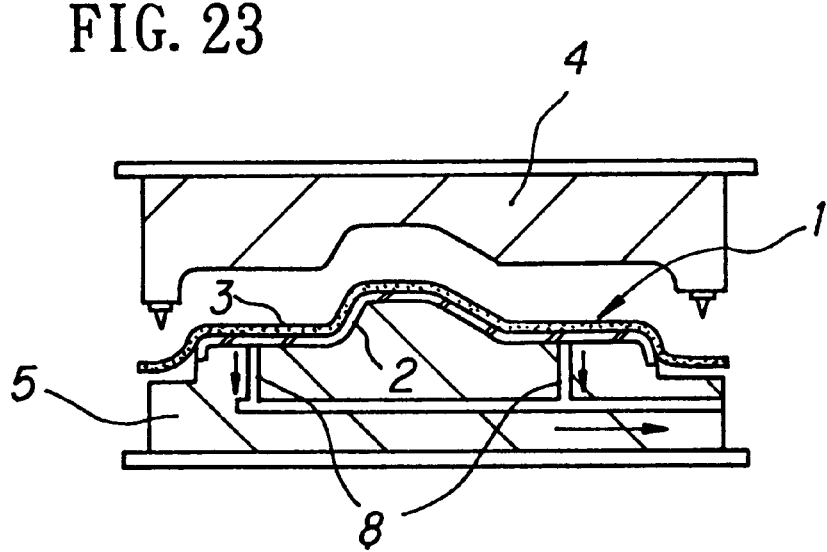
FIG. 23 is a sectional view of a conventional molding device using vacuum suction to retain the molded assembly to the lower die.
Figure 24:
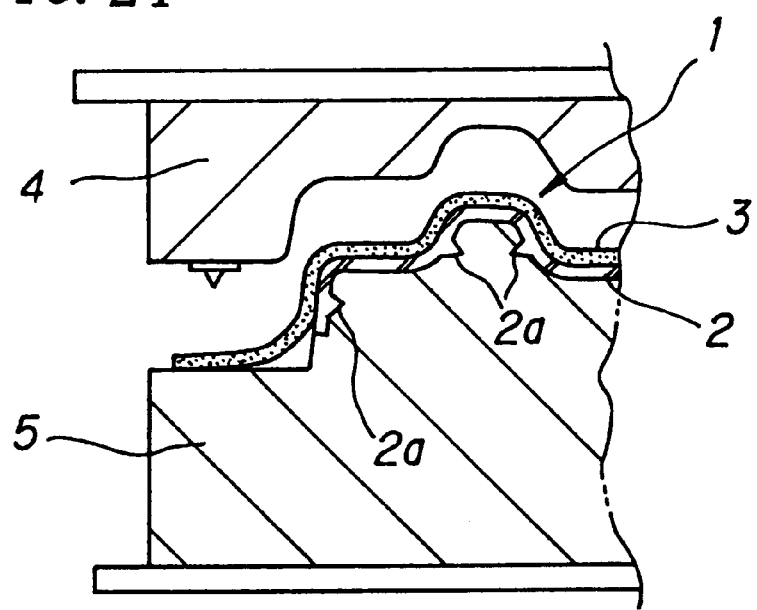
FIG. 24 is a sectional view of a conventional molding device using undercut portions of the molded product to retain the molded assembly to the lower die.

FIG. 20 shows an essential part of a modified embodiment of the air blow mechanism 60, and the blow air plug 49 in this case is provided with a plurality of slits 53 extending axially along the cylindrical outer circumferential surface thereof. Therefore, simply by securely fitting the plug 49 in each of recesses 46 provided in the upper die 40, air can be blown against the molded product from the slits 53 provided around the blow air plug 49.

According to this embodiment, in the same way as in the previous embodiment, the removal of the molded product from the upper die 40 is facilitated, and the slits 53 provided in the blow air plug 49 can be substantially more readily and economically formed than air holes 48.

As described above, the present invention can offer the following advantages.

(1) According to a certain aspect of the method of the present invention for mold press forming a laminated molded assembly consisting of a resin core member and a surface skin member, since an air blow mechanism is provided in the upper die for blowing hot air against the surface skin member from air blow holes, the surface skin member can readily conform to the die surface of the upper die during the process of mold press forming, even when the molded product is provided with a complex contoured shaped, the breakage of the surface skin member and the leakage of resin material from such a breakage can be avoided. Therefore, the present invention offers the advantages of increasing the freedom of the shape of the product, and reducing the occurrence of unacceptable molding results.

(2) According to a certain aspect of the method of the present invention for mold press forming a laminated molded assembly consisting of a resin core member and a surface skin member, since air blow and vacuum holes are provided in the upper die so that the surface skin member may be given with a necessary elongation property by blowing hot air against the surface skin member via the air blow and vacuum holes and the surface skin member may be vacuum molded against the die surface of the upper die by applying vacuum to these air blow and vacuum holes, the moldability of the surface skin member can be substantially improved, and the product can be reduced in thickness and weight through increase in the fluidity of the molten resin.

(3) According to a certain aspect of the method of the present invention, air is blown from the upper die following the completion of the step of mold press forming by using an air blow mechanism provided in the upper die so as to facilitate the removal of the molded product from the upper die, the speed of opening the upper die can be increased, and the rising speed of the eject pin provided in the lower die can be increased. Thus, the time required for the overall fabrication process can be reduced, and the productivity can be increased.

(4) According to a certain aspect of the method of the present invention, since the air blow mechanism or the vacuum mechanism provided in the upper die is used for blowing air via the air blow holes or the air blow and vacuum holes for allowing the molded product to be readily removed from the upper die following the completion of the process of mold press forming in addition to using the same mechanism for preheating and vacuum molding the surface skin member, the molded product can be so readily removed from the upper die that the pulling of the molded product when opening the die assembly can be avoided even when the speed of opening the die assembly is increased, and undercut portions of the molded product are not damaged. Thus, the time required for the overall molding process can be reduced and the molded product is made less prone to damages.

(5) According to a certain aspect of the method of the present invention, air is blown against the molded product from the upper die following the completion of the step of mold press forming by using an air blow mechanism provided in the upper die so as to facilitate the removal of the molded product from the upper die, there is no need to provide undercut portions in the resin core member so that the damage and deformation of such undercut portions can be avoided, and the weight of the molded product can be reduced.

(6) According to the method of the present invention, air is blown from the upper die following the completion of the step of mold press forming by using an air blow mechanism provided in the upper die so as to facilitate the removal of the molded product from the upper die, the restriction on the material and thickness of the molded product can be eliminated, and not only the range of material selection can be expanded but also the freedom in the design of the shape of the molded product can be increased.

(7) According to a certain aspect of the device for molding a laminated molded assembly, since the moldability of the surface skin member can be increased and the molded product can be more readily removed from the upper die when opening the die assembly simply by providing air blow holes or air blow and vacuum holes in the upper die, and connecting them with an air blow mechanism or a vacuum mechanism at least partly associated with a hot air generator, the present invention offers the advantage of substantially improving the functionality of the molding device.

(8) According to the molding device of the present invention, because it features the provision of air blow piping, and air blow plugs communicating with the air blow piping both in the upper die, and its structure is therefore substantially more simple and economical as compared to the conventional structure involving the provision of a vacuum suction mechanism in the die assembly, therefore requiring nothing to be provided in the upper die which might obstruct the provision of the piping in the upper die, the freedom in the design of the piping can be substantially increased as compared to the conventional structure involving vacuum suction.

Although the present invention has been described in terms of specific embodiments thereof, it is possible to modify and alter details thereof without departing from the spirit of the present invention. For instance, the piping or the conduits provided in the upper die in each of the disclosed embodiments were described as being capable of limited functions, but it was only for the purpose of illustrating such possibilities, and according to the principle and spirit of the present invention, it is possible to utilize the piping and conduits provided in the upper die for softening the surface skin member, applying vacuum suction to the surface skin member to draw it against the die surface of the upper die, and blowing air of either high temperature or ambient temperature or even low temperature to facilitate the removal of the surface skin member or the laminated molded assembly from the die surface of the upper die.

What we claim is:

1. A method of mold press forming a laminated assembly comprising a surface skin member and a resin core member, comprising the steps of:
   opening a die assembly including a first die having a first die surface having a prescribed surface contour, and a second die surface adapted to cooperate with said first die surface to define a cavity for mold press forming, second die being provided with at least one air hole communicating said second die surface with air pressure control means;
   mounting a surface skin member over said second die surface of said second die;
   introducing hot air into said air hole by using said air pressure control means, the temperature of said hot air being such as to soften said surface skin member;
   supplying molten resin on said first die surface of said first die;
   closing said die assembly while said molten resin and said surface skin member retain at least some of their plastic properties so as to mold said molten resin into said resin core member and to integrally join said surface skin member with said resin core member; and
   opening said die assembly to remove a thus completely laminated molded assembly therefrom.

2. A molding method according to claim 1, further comprising the step of applying vacuum suction to said air hole by using said air pressure control means so as to draw said surface skin member against said second die surface of said second die following the step of softening said surface skin member by introducing hot air into said air hole.

3. A molding method according to claim 2, further comprising the step of supplying hot air to said air hole by using said air pressure control means so as to separate said surface skin member from said second die surface of said second die immediately before the step of opening the die assembly to remove said laminated molded assembly.

4. A molding method according to claim 2, further comprising the step of supplying air of ambient temperature to said air hole by using said air pressure control means so as to separate said surface skin member from said second die surface of said second die immediately before the step of opening said die assembly to remove said laminated molded assembly therefrom.

5. A molding method according to claim 1, further comprising the step of supplying air of ambient temperature to said air hole by using said air pressure control means so as to separate said surface skin member from said second die surface of said second die immediately before the step of opening said die assembly to remove said laminated molded assembly therefrom.

6. A molding method according to claim 1, wherein said surface skin member consists of a thermoplastic elastomer.

* * * * *